(12) United States Patent
Sclar et al.

(10) Patent No.: US 11,347,829 B1
(45) Date of Patent: May 31, 2022

(54) METHOD AND SYSTEM FOR CALCULATING EXPECTED HEALTHCARE COSTS FROM INSURANCE POLICY PARAMETERS

(71) Applicant: ClearHealthBill LLC, Stamford, CT (US)

(72) Inventors: Jennifer Sclar, Stamford, CT (US); Kareem Ayoub, Oxford (GB); Len Kunin, New York, NY (US); Kathryn Wollan, Ossining, NY (US); Kelly Northridge, Reno, NV (US)

(73) Assignee: ClearHealthBill, LLC, Stamford, CT (US)

( * ) Notice: Subject to any disclaimer, the term of this patent is extended or adjusted under 35 U.S.C. 154(b) by 961 days.

(21) Appl. No.: 14/497,676

(22) Filed: Sep. 26, 2014

Related U.S. Application Data (60) Provisional application No. 61/883,082, filed on Sep. 26, 2013.

(51) Int. Cl.
| | |
|---|---|
| *G16Z 99/00* | (2019.01) |
| *G16H 50/30* | (2018.01) |
| *G16H 50/20* | (2018.01) |
| *G06F 19/00* | (2018.01) |

(52) U.S. Cl.
CPC .................. *G06F 19/328* (2013.01)

(58) Field of Classification Search
CPC ........ G06Q 50/22; G06Q 10/10; G06Q 10/04; G06Q 30/0629; G06F 19/328; G06F 19/345; G06F 19/322; G06K 9/6215
See application file for complete search history.

(56) References Cited

U.S. PATENT DOCUMENTS

| | | | | |
|---|---|---|---|---|
| 7,555,439 | B1 * | 6/2009 | Binns ..................... | G06Q 10/10 705/4 |
| 7,664,662 | B1 * | 2/2010 | Binns ..................... | G06Q 10/10 705/4 |
| 7,974,860 | B1 * | 7/2011 | Travis .................... | G16H 10/20 705/4 |
| 8,005,687 | B1 * | 8/2011 | Pederson ............... | G06Q 10/06 705/2 |
| 2002/0147617 | A1 * | 10/2002 | Schoenbaum ......... | G06Q 40/08 705/4 |

(Continued)

OTHER PUBLICATIONS

Christopher M. Bishop, Pattern Recognition and Machine Learning, Oct. 2007, pp. 137-173, Springer, NY, NY USA.

(Continued)

*Primary Examiner* — Robert W Morgan
*Assistant Examiner* — Edward B Winston, III
(74) *Attorney, Agent, or Firm* — Ted Sabety; Sabety + associates, PLLC (57) ABSTRACT

A system and method for calculating expected out of pocket health care costs for a user during a set period of time is presented. The system relies on statistical data about health services utilization in combination with data about the user to estimate the expected usage. The system utilizes machine learning techniques to predict utilization of healthcare services based on user health status data. This information in combination with expected costs to deliver the specific services expected to be used provides the basis for calculating costs.

48 Claims, 5 Drawing Sheets

(56) References Cited

U.S. PATENT DOCUMENTS

| | | | | |
|---|---|---|---|---|
| 2005/0130230 | A1* | 6/2005 | Davalos | G01N 33/6893 435/7.1 |
| 2005/0222867 | A1* | 10/2005 | Underwood | G06Q 40/08 705/2 |
| 2006/0036419 | A1* | 2/2006 | Cook | G16H 20/60 705/300 |
| 2007/0027636 | A1* | 2/2007 | Rabinowitz | G16H 50/50 702/20 |
| 2007/0043595 | A1* | 2/2007 | Pederson | G16H 20/10 705/2 |
| 2007/0271119 | A1* | 11/2007 | Boerger | G06Q 40/08 705/2 |
| 2008/0147441 | A1* | 6/2008 | Kil | G16H 50/30 705/2 |
| 2008/0301070 | A1* | 12/2008 | Bartlett | G06K 9/623 706/12 |
| 2009/0299767 | A1* | 12/2009 | Michon | G16H 50/30 705/3 |
| 2010/0324936 | A1* | 12/2010 | Vishnubhatla | G16Z 99/00 705/3 |
| 2011/0173142 | A1* | 7/2011 | Dasgupta | G06N 20/10 706/12 |
| 2012/0259654 | A1* | 10/2012 | Vanderzee | G16H 70/20 705/2 |
| 2013/0132113 | A1* | 5/2013 | Drobac | G16H 40/67 705/2 |
| 2013/0231955 | A1* | 9/2013 | De Villiers | G16H 50/20 705/3 |
| 2014/0114674 | A1* | 4/2014 | Krughoff | G06Q 30/0629 705/2 |
| 2015/0019235 | A1* | 1/2015 | Roychowdhury | G06Q 30/0627 705/2 |
| 2015/0025903 | A1* | 1/2015 | Mueller-Wolf | G16H 80/00 705/2 |
| 2015/0299797 | A1* | 10/2015 | Bild | C12Q 1/6886 506/9 |

OTHER PUBLICATIONS

Kevin P. Murphy, Machine Learning: A Probabilistic Perspective, Aug. 2012, pp. 281-305, MIT Press, USA.

Alex J. Smola & Bernhard Scholkopf, A Tutorial on Support Vector Regression, NeuroCOLT2 Technical Report Series, Oct. 1998.

Ronan Colloberty & Samy Bengio, SVMTorch Support Vector Machines for Large-Scale Regression Problems, Journal of Machine Learning Research 1, pp. 143-160 (2001).

* cited by examiner

| Service | Adult 1 | Family Total |
|---|---|---|
| Chiropractor Care | 0.1 | 0.1 |
| Outpatient Non-Surgery | 0.1 | 0.1 |
| Emergency Room Visit | 0.1 | 0.1 |
| Lab Test | 0.1 | 0.1 |
| X-Ray | 0.1 | 0.1 |
| Primary Care Doctor Visit | 0.8 | 0.8 |
| Well Visits / Checkup | 0.8 | 0.8 |
| Mental Health Visit | 0 | 0.0 |
| Hospitalization | 0 | 0.0 |
| Outpatient Surgery | 0 | 0.0 |
| Imaging (MRI, CT Scan, Ultrasound) | 0.1 | 0.1 |
| Specialist Doctor Visit | 0.7 | 0.7 |
| Urgent Care Visit | 0.1 | 0.1 |
| Reset To Estimate | | |
| | | |

METHOD AND SYSTEM FOR CALCULATING EXPECTED HEALTHCARE COSTS FROM INSURANCE POLICY PARAMETERS

PRIORITY CLAIM

This application claims priority to U.S. Provisional Application No. 61/883,082 filed on Sep. 26, 2013, which is incorporated by reference for all that it teaches.

FIELD OF INVENTION

This invention relates to providing consumers of health care services the opportunity to more accurately compare one health insurance plan against another. When comparing insurance policies, typically, consumers consider premiums, deductibles and out-of-pocket maximums. The comparison of actual out-of-pocket costs of health care is often attempted but soon abandoned as unfortunately, making this estimate is highly complex. Therefore, consumers often compare the premium and deductible of the insurance policies and consider their income-leaving it at that. The consumer typically makes an uninformed view of their expected healthcare needs in the future. This can be highly problematic if the consumer will likely face expensive medical care requirements. Therefore, there is a need to provide a tool for consumers to use in order to more accurately compare the actual out of pocket costs of healthcare under different health insurance regimes.

BACKGROUND

The invention takes advantage of statistical data and historical regarding health care service utilization in order to create a utilization model that can be used to drive a prediction engine. The model can take as input data information about a patient or group of patients. The model can be used to determine estimated healthcare usage costs for a particular person based on their health status. These costs can then be used by an out of pocket calculator module that calculates what the patient or patients would actually pay based on predetermined insurance parameters, for example, premium, deductible and maximum coverage. The consumer enters information. Then medical care utilization values are populated as a starting point. These utilization values are applied to pre-determined average costs and insurance plan stipulations (which are input as data into the system) to arrive at an average out of pocket cost. This way, the consumer can choose plan based on the total health costs of premiums plus estimated out of pocket costs. The preferred embodiment of the invention is a system and method that uses supervised or semi-supervised machine learning algorithms to calculate health insurance utilization values based on user health condition data that is input into the system. These health condition values can include data values representing pre-existing conditions, user health information, and other user-supplied information. The system then determines expected utilization costs using the data and as a result, the system can estimates the costs for each user associated with various insurance plans.

DETAILED DESCRIPTION OF THE PREFERRED EMBODIMENTS

Figure 1:
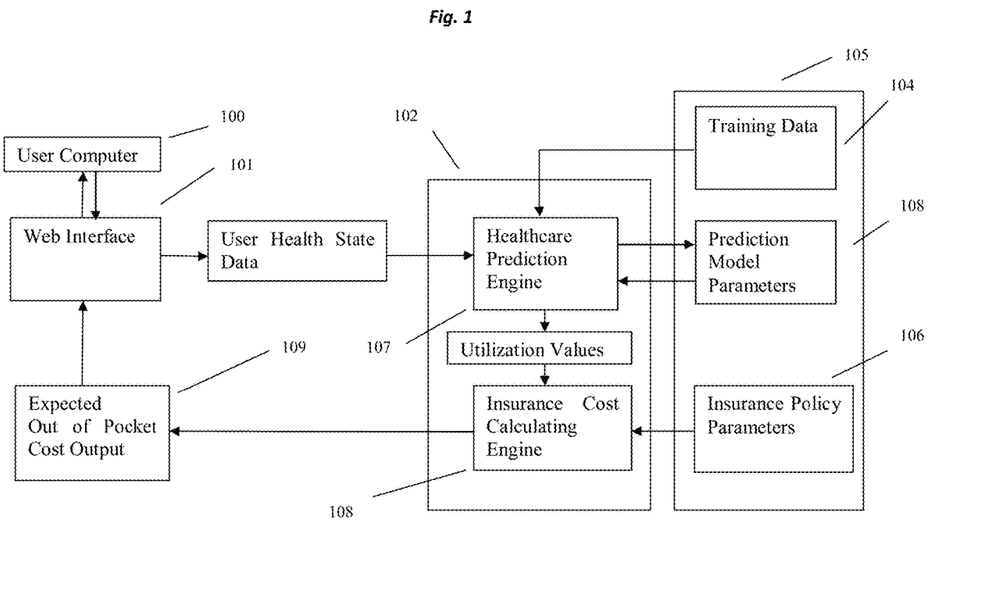
FIG. 1. Depicts the functional elements of the system architecture in one embodiment.

One embodiment of the invention is a computer system adapted to have several components. First, there is a module that receives from users computers (100) data that describes their health condition, for example: age, gender, existing conditions, and physical characteristics. This data can be input into a web-browser operating on the user's computer (100) that interfaces through a webpage interface (101) with a second component, the server system (102), that houses other components of the system. Third, there are sources of medical services utilization data that are used to train the system. (104). These can include Medical Expenditure Panel Survey (MEPS), National Health and Nutritional Examination Survey (NHANES), Surveillance Epidemiology and End Results (SEER), SEER-Medicare, Medicare and Medicaid, and the National Ambulatory Medical Care Survey (NAMCS). The system servers (102) can receive this data from external databases housing the data (105). These databases may be local to the server and connected by local area network, or they may be data sources available over the Internet. In another embodiment, the data housed externally is received and stored locally to the system in its local database. Fourth, there are data sources that hold data parameters that describe health insurance policies or health care plans. (106). This data may be organized where a data structure corresponds to each policy, and the data structure contains a policy issuer, a policy product index number, a premium, a deductible a coverage maximum and policy parameters (coverage, copayments and coinsurance). The data may be stored in relational tables, where one table contains data representing one or more insurance policies. The data parameters for an insurance policy may also include a list of exclusions. For example, many health insurance policies exclude certain tests or procedures and consider them optional rather than an obligatory step in treating a condition. As with the medical care utilization data, this data may be stored locally or externally in a database.

Once the training data is provided to the system, the system can calculate parameters that define a healthcare usage prediction model. These are stored in the database (108). The prediction model parameters (108) are used by the prediction engine (107) to calculate utilization rates or values for a set of healthcare services. This utilization data then is applied to an insurance policy calculating engine (108) that relies on the insurance policy parameters (106) in order to determine an out of pocket cost prediction for that individual or family under that insurance policy (109). This output can then be transmitted to the user by means of the web interface (100).

In one embodiment, the system constructs a set of multivariate regression models using nationally representative data from the Medical Expenditure Panel Survey (MEPS), National Health and Nutritional Examination Survey (NHANES), Surveillance Epidemiology and End Results (SEER), SEER-Medicare, Medicare and Medicaid, and the National Ambulatory Medical Care Survey (NAMCS). In another embodiment, this data is augmented with private insurer data in the future. For each individual, the system will calculate a prediction of the expected medical care utilization based on age, gender, current health conditions, current self-reported health status and any other individual data that may be input.

To calculate the prediction, for each individual, in one embodiment the system assigns each utilization category defined in the insurance policy or health plan subject to the calculation, a randomly selected month in the year. Examples of categories can include office visits, diagnostic tests, e.g. x-ray, cat-scan, other imaging types, blood tests, pathology lab review. The random selection can be weighted or un-weighted. In one embodiment, this assignment can be based on the timing on real world data about temporal patterns of resource use. Weighted selection can be used where there is statistical data indicating that certain categories are used more often in certain seasons. For example, immunizations are more likely in autumn months, while orthopedic diagnostics may be more typical in the winter.

The system then identifies the utilization item that satisfies the individual deductible of the insurance or health plan. For groups of patients, for example, families, the prior steps are repeated, but the data aggregated in order to calculate the family level deductible and out-of-pocket maximum for the family level policy. For example, in a family, it may be that one individual has exhausted their individual deductible but the family deductible as a whole has not been exhausted. In that situation, the system would apply an expected utilization by another family member or members to that unexhausted family level deductible amount. In other cases, one family member could exhaust the family deductible, depending on the amount of the deductible and the cost of medical services used. Once the individual and/or family deductibles have been satisfied, costs are calculated in accordance with the insurance policy or health plan parameter, taking into account the ceiling on the individual or family out-of-pocket costs and the amount of co-insurance and/or copayment for each service, as indicated in the insurance policy or health plan parameters.

Next, the system identifies the utilization item that satisfies the individual out-of-pocket maximum, if there is one. For example, a hospitalization in November may trigger the annual out-of-pocket maximum. After this, all costs will be deemed to be reduced to zero. In one embodiment, the treatment of the out of pocket maximum will be similar to the treatment of the deductible with regard to individuals that are part of family plans in that the maximum may not be exhausted for the family while being exhausted for the individual.

The calculation that one embodiment of the system uses to determine an out of pocket cost for a predetermined period of time is presented below:

$$PMT = \Sigma_n [P_i * I(C_i)]$$

where the out of pocket payment for time period PMT, is equal to the sum over the n possible utilization categories of n cost terms, each cost term equal to the probability $P_i$ that during that time period, that particular utilization will be needed, at cost $C_i$, times an insurance function of the actual cost of delivering the service in that category to the patient (I). The insurance function is simply the application of the insurance policy parameters to the costs of the utilized medical service category. In one embodiment, a simple policy with a deductible D, would have I(C)=C for C<D while I(C)=D for C>D. In other words, the policy pays nothing until the cost C is above the deductible, in which case, the patient has paid the deductible amount.

More complicated insurance functions (or health plan functions, which are essentially similar), may be used. The insurance function can get complicated as a result of historical results. As in the case of a maximum payment under a policy, the amount of expected payment in a time period will be a function of the expected payments made in prior time periods. For example, if the policy has a co-pay amount that is above the deductible, then the I(C)=D+CoPay for C>D, while I(C)=0 if Σ[PMT]>Max, for policies that have a maximum, in other words, if the sum of all the payments have reached the maximum for that policy.

In some embodiments, the system takes into account that there are plans that have both individual and family deductibles. In some of these plans, an individual may satisfy his/her deductible and move to copayment/co-insurance spending, but the remaining family members have not reached their deductible amounts for the year and incur the full cost of the negotiated payment. The data structure encoding the characteristics of the insurance policy would reflect these particulars. The system would retrieve this data and the system logic would modify the flow of calculation in order to properly account for how the costs of expected utilization would be treated by the policy parameters as a whole.

The system uses the sub calculations described above to estimate family out-of-pocket costs based on individual and family deductibles, copayment, co-insurance, and out-of-pocket maximum specifications for each type of policy or plan. From this, the system can generate a single expected cost for each plan type that can be compared against the expected premium costs or other cost parameters associated with the policy or health plan.

In one embodiment, the process can be repeated so that the random selection occurs several times. To the extent this produces different results, the results may be used to present a range of expected costs or an average expected value of costs. In this embodiment, Monte Carlo modeling may be used. Furthermore, the Monte Carlo modeling can show the proportion of repetitions that a particular plan or policy is optimal for the consumer's purposes.

In yet another embodiment, the cost of utilization can be modeled using Markov chains. In this case, it may be that for a given person of certain physical characteristics, they have a particular probability of having a particular diagnostic test performed, say P1. However, that test result may, with probably P2, come out positive, while 1-P2 negative. The system can use Markov modeling to consider that for patients whose test is positive, there is another probability P3 that they would need some other test or treatment within some predetermined time, and so on to complete treatment. Thus, the utilization can more accurately modelled over longer periods of time. Using Markov chain modelling of the probabilities may also be used to make the Monte Carlo method more thorough.

The use of these models can also be used to calculate an expected utilization or an expected cash flow or range of cash flows over some predetermine period. For example, a customer may want to predict the costs of health care over a 5 or 10 year period. In this case, the Markov modeling and Monte Carlo modeling can provide greater insight into the possible range of costs over that time, given a particular health plan or policy. In yet another embodiment, a user can also input into the system different health plan or insurance policies that apply at different times. For example, a user could input a 5 year period that has a very high deductible and very low premium, followed by a 5 year period where the policy has a low deductible and a higher premium, as part of a financial plan. The system could provide a realistic assessment of how that scenario might play out over 10 years.

In one embodiment, the system applies user inputs such as income, family size and age to calculate the availability and size of federal, tax subsidies and cost-share reductions, and penalties. Based on these calculations, the system retrieves data that corresponds to pertinent plans (for example, catastrophic, bronze, bronze+health savings account HSA, silver, gold or platinum, or plans based on actuarial values or categories), where age, income, and family size and applies the appropriate insurance function to calculate the expected out-of-pocket costs.

In one embodiment, the system applies user inputs such as income and family size to calculate tax credits and eligibility for private and/or employer-based insurance plans and retrieves data that corresponds to pertinent plans (health savings accounts HSA, high-deductible health plans HDHP, health management/maintenance organization HMO, preferred provider organization PPO) and applies the appropriate insurance function.

One embodiment of the invention uses supervised or semi-supervised learning algorithms to calculate health insurance utilization values based on user health conditions—health conditions including pre-existing conditions, anticipated or hypothetical conditions or procedures, user health information, and other user-supplied information. From these utilization values, the system estimates costs for each user associated with various insurance plans. In this embodiment, the user provides the health state of the user or the user's family members. In yet another embodiment, the user may have electronic health monitoring devices worn by the user that are connected to the system by a data network and by means of inter-process communication over the network, the system can query the device, verify the user's identity and update data about the user's health in near-real-time. In other embodiments, the system accesses electronic medical records associated with the user to get specific information about the user without the user being required to re-input this information.

In yet another embodiment, the utilization values can be calculated using even more sophisticated methods. In this embodiment, the system uses machine learning algorithms as a multivariate, non-linear approach to model medical insurance costs to the subscriber by using predictive analytics to determine more accurate utilization values given the unique characteristics of the subscribers that are input into the system. By using multi-dimensional data structures and calculation processes, the expected utilization of healthcare services can be predicted using complex feature patterns in the input datasets and verify those models for predictive accuracy using cross-validation techniques.

In some embodiments, the system can use unsupervised learning algorithms to predict user group-type utilization, for example, determining a more general category that a user may occupy based on the input values. These may be designated as high user, medium user or low user, of health insurance. However, a determination of continuous utilization values cannot be calculated from unsupervised learning algorithms because these algorithms are used for clustering unlabeled datasets into classes. Nonetheless, use of these types of machine learning techniques to determine a general expense level category may be sufficient information for some users to select or compare health insurance policies that are available to them.

Figure 4:
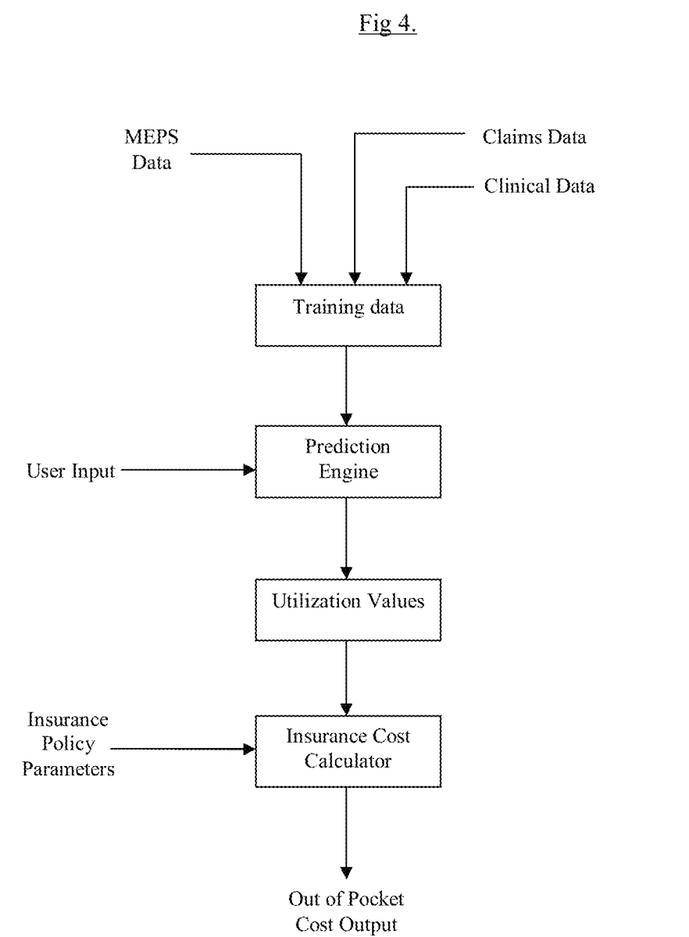
FIG. 4. A flowchart showing the basic system architecture.

In the embodiment that uses machine learning, the computer system is adapted to exploit hidden patterns in complex datasets in order to arrive at a prediction of utilization. Specifically, there are two large categories of machine learning algorithms: supervised and unsupervised algorithms. Semi-supervised learning algorithms are hybrids of both of these aforementioned training paradigms. In the preferred embodiment, the invention uses supervised and semi-supervised learning algorithms to train adaptive programs to predict utilization values based on pre-existing health information from users. See FIG. 4. In other embodiments, the invention uses unsupervised machine learning algorithms to predict which utilization group a user is a part of (i.e. low, medium, or heavy use of their insurance plans for various healthcare services).

In the embodiment that uses a supervised learning algorithm, the computer program is provided with training data, $\vec{x}$, along with corresponding output data, $\vec{t}$.

$$\vec{x} = [x_1, x_2, x_3, \ldots x_N]$$

$$\vec{t} = [l_1, l_2, l_3, \ldots, l_N]$$

Supervised learning algorithms employ multivariate pattern recognition to understand the relationships between input and output data. Then, algorithms are provided with new data with an output that is not known. Specifically:

Given: $\hat{x}$

Predict: $\hat{l}$

The training and input data can span any defined dimensions of input information, allowing the incorporation of heterogeneous data to be used to drive the adaptation of the algorithm. Output data can be discrete classes (e.g. class 1=on and class 2=off) that the input data are mapped onto. Output data can also be continuous, such as calculating a predicted utilization rate for a specific healthcare service and also the cost of an insurance policy based on the policy parameters.

The invention can use a range of input data from the user to populate the data sets. Fore example, the supervised learning algorithms will use health care historical data sources which can include (but are not limited to): Medical Expenditure Panel Survey (MEPS) data, insurance claim data, user clinical outcome data, and essentially any data that describes a population of patients in terms of their health status history and their respective medical usage history. See FIG. 4. However, these data sources may have to be converted so that their data conforms to presenting a set of healthcare service types and historical usage values associated with patients that have particular health state information.

A user can input data into the system about their current health state in a variety of ways. Typically, the user will input (typically using a website to access an embodiment of the invention) their current health statistics, e.g. age, sex, height, weight, location of residence, blood pressure, cholesterol level, pre-existing conditions, smoker status, exercise habits and/or income. In other embodiments, the user's current data is derived from electronic medical records that are electronically stored. In yet other embodiments, user data can include data received from wearable devices that track user's health in real time by means of appliances worn by the user. Any of this in combination may be used. This input dataset will comprise the input space, $\vec{x}$. Specifically, a feature vector for all entries will be constructed for each user, and stored in a data structure in the computer memory or mass data storage device. For example, for each user, there can be a data structure:
[<User ID><No. of household members><zip code><family income><pre-existing conditions (taken from MEPS dataset potentials)><gender><year of birth><smoker status><general health level>]

The output vector for each user represents the expected usage of a set of predetermined healthcare service types, where the variables are the utilization rates for the healthcare services, including but not limited to:
[<User ID><chiropractor care><outpatient non-surgery><emergency room visit><lab test><x-ray><primary care><well visits/checkup><mental health visit><hospitalization><outpatient surgery><imaging (MRI, CT Scan, Ultrasound)><specialist doctor visit><urgent care visit>]
So, for example an entire user input vector and output vector can be combined as such:
[User#10387<1 adult><0 children><12345><$50,000><myocardial infarction><male><1976><non-smoker><excellent>]=[1 4 2 2 4 8 2 0 2 0 3 1 4]
The output vector, which is after the =sign, are the utilization rates for the various predicted healthcare types. As further explained below, in the preferred embodiment, a different prediction model is used for each healthcare type.

Other embodiments may maintain the input and output vectors as separate data structures, either methodology or other methodologies of creating a data structure for storing and organizing this data may be used. In some embodiments, the data may be stored in relational tables.

The prior vector is an example entry that a supervised machine learning algorithm would take in as test data for training purposes, along with several thousand similar to that presented. These feature vectors and mapped output vectors are concatenated into a single matrix. Then, supervised learning algorithms are trained to find the best way to map the input vectors to the output vectors in a way that also generalizes best across all of the data sets. This is necessary because a future user of the invention will just provide the input vector and the system, will calculate a prediction of the output vector (i.e. the healthcare utilization values for each dimension or type of healthcare cost.) Once the learning algorithm has determined the map, a new user's input vector drives the mapping calculation in order to obtain the output vector of utilization values. In the simplest form, the map is a matrix of coefficients and the predictive calculation a cross product of the input vector with the mapping matrix. Ultimately, the mapping from the input vectors comprised of the user health status information to the output vectors comprising the utilization values is stored in the computer memory in the form of a series of parameter values that are used for a sequence of calculations performed by the central processing unit or units comprising the system.

Figure 2:
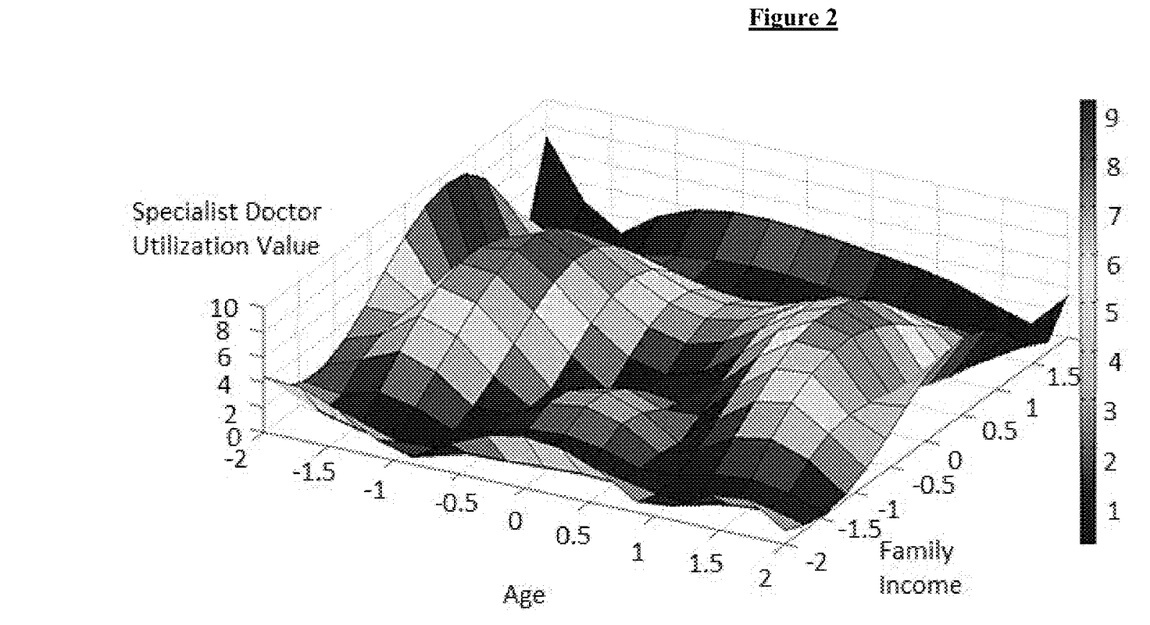
FIG. 2. A graph showing an example utilization value for specialist doctor use as a function of two user input valies, age and family income.

The invention uses various supervised learning algorithms that are adapted to better work with the healthcare data. In the preferred embodiment, the invention uses support vector machine (SVM) and regression (SVR). These algorithms learn patterns to discriminate classes (in the case of SVM) and continuous values (in the case of SVR). In FIG. 2, the graph depicts an example of how support vector regression (SVR) works in a 3-dimensional model where the input is the two dimensional space of [<family income><age>] and the output is [<specialist doctor utilization value>]. Support vector regression is further described in the article by Alex J. Smola and Benrhard Scholkof, GMD, NeuroCOLT2 Technical Report Series, NC2-TT19918-030, October, 1998, available at http://svms.org/tutorials/SmolaScholkopf1998.pdf, which is hereby incorporated by reference.

The surface in FIG. 2 shows the function that most accurately maps the complex relationship between the input space to the output space. The goal of SVR is to develop a function (or preferably a set of functions) that best maps the input space to the output space within a given error margin (f(x)+/−ε). In one embodiment, the parameters that define the functions are developed via supervised learning. The invention uses supervised learning algorithms to discover multivariate patterns in datasets of information related to health services utilization values to a subscriber. Specifically the input, training space consists of:

$$\vec{x} = [\langle \text{User } ID \rangle \langle \text{No. of household members} \rangle \langle \text{zip code} \rangle \langle \text{family income} \rangle$$
$$\langle \text{pre-existing conditons(taken from } MEPS \text{ dataset potentials)} \rangle$$
$$\langle \text{gender} \rangle \langle \text{year of birth} \rangle \langle \text{smoker status} \rangle \langle \text{general health level} \rangle]$$

Where feature vectors consist of AvgVisits, AvgCosts, and AvgFacility. AvgVisits includes reported answers on claims forms of the average number of visits a previous patient has had to certain clinics including: urgent care, primary care, preventative care, and specialist care. AvgCosts include the average physician-associated costs with the above visits and AvgFacility includes the average facility-associated costs with the above clinical visits and tests. The output values to predict are utilization values and health insurance costs (dependent on utilization values) amongst different insurance plans whose defining parameters are pooled in a database comprising the system The training process for the prediction engine starts with the MEPS dataset, $X^{\rightarrow}$ that is 1 data entries (i.e. number of patients in the training data set) by d dimensions (the number of health state variable values) such that X is size (l, d). Furthermore, we have a corresponding real y value for each utilization rate vector in the MEPS dataset. For example, a particular patient's health characteristics also have corresponding values for the number of specialist visits that the patient incurred. In one embodiment, a linear form of regression is used, whereby a linear function is used to model the prediction. In particular, the output utilization value for a particular health service, f(x) is a dot product of the user's input vector x with a weight vector w plus a bias value b.

$$f(x) = \langle w, x \rangle + b$$

Here, f(x) denotes the predicted value of the utilization value for the patient with health status vector x. For example, above we indicated a real value for the expected number of specialist visits. In training using supervised learning algorithm via support vector regression, the system estimates a value for the that number of specialist visits. In order to calculate the predicted value of utilization via the SVR model, the system takes a dot product of weights, w (size is 1×d), and the input vector for any patient (size is d×1). When the dot product is taken, a predicted value is calculated and a bias term, b is added. In one embodiment, the system will normalize the training data such that the bias term can be eliminated.

Training the prediction engine involves finding the weights, w, such that they provide the best possible estimate, f(x) which bests generalizes to future data that users will input into the prediction engine as they seek to calculate insurance policy costs using the invention. In order to do this, of the system is adapted to take into account a margin around the estimate f(x), which is designated as +/−ε. Then, the system can estimate the w weights based by imposing a constraint of minimizing the Euclidean norm of the weights while maintaining accuracy within the bounds of the margin. This insures that the model selected to predict f(x) is the simplest (flattest) model possible. Therefore the training process seeks to minimize:

$$\frac{1}{2}\|w\|^2 \text{ such that, } \begin{cases} y_i \langle w, x_i \rangle - b \le \varepsilon \\ \langle w, x_i \rangle + b - y_i \le \varepsilon \end{cases}$$

In other words, we want to minimize the Euclidean norm of the weights vector such that the absolute value of the difference between the actual outcome values ($y_i$) in the MEPS data and the estimated utilization value f(x) applied to the training input vectors $x_i$ derived from the MEPS data is less than or equal to the margin parameter, s. The margin parameter can be selected empirically to provide sufficiently accurate results. Unfortunately, this optimization problem is not always feasible. Therefore, instead of having a hard margin, ε, the system is adapted to use a soft margin, ε, with slack variables: ξ and ξ*. This allows for an optimization where there is room for some error in the predictive model estimation by adding in a cost function for each point that lies outside of the margin. The minimization of the weights then happens by minimizing the Euclidean norm of the weights compounded by the cost function value for each data vector in x from i=1 to i=1 (i.e. the Euclidean norm plus the residuals for each training patient data prediction deviation from the $y_i$ real outcome utilization value):

$$\text{minimize } \frac{1}{2}\|w\|^2 + C \sum_{i=1}^{\ell} (\xi_i + \xi_i^*)$$

$$\text{subject to } \begin{cases} y_i - \langle w, x_i \rangle - b \le \varepsilon + \xi_i \\ \langle w, x_i \rangle + b - y_i \le \varepsilon + \xi_i^* \\ \xi_i + \xi_i^* \ge 0 \end{cases}$$

Figure 3:
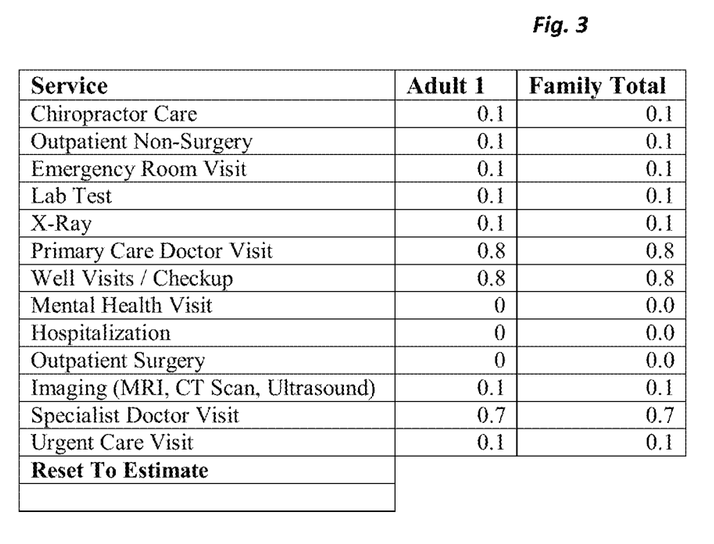
FIG. 3. A table showing an example output utilization rate vector for an adult and family.

Here, the constant C is also empirically selected by the programmer. It weights how important the errors outside of the margin are to the predictive model selection. A greater C penalizes f(x) points outside of the accepted epsilon boundary more heavily. Once the weights are minimized, bearing in mind this new cost function, the system has 1×d vector of weights. And this constitutes the trained predictive model. This process of training is carried out using k-fold cross validation to achieve an optimal model. Each output utilization rate of a particular health care service has its own unique set of weights. This means that there is a model with associated weights for each utilization value. In other words, there is a w vector for the "specialist visits" model and there is a different w vector for the "primary visits" utilization value. FIG. 3 is an example of a set of utilization values for each healthcare service listed. FIG. 2 is a graph showing an example utilization value result for specialist visits as a function of patient age and family income.

Figure 5:
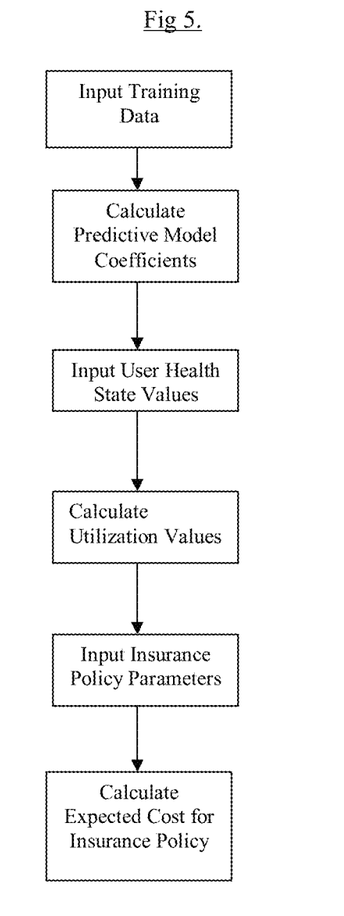
FIG. 5. A flowchart showing the basic system procedural steps

Once there is a w vector for each category of healthcare service in the output vector, the predictive engine is trained and ready for use. Turning to FIG. 1, a new user of the prediction engine can then go online and enter their own health status data (which constitutes a 1×d vector). Then the system uses the dot product of this vector with the weights that were calculated earlier to arrive at f(x), which is an optimally accurate estimate of that user's utilization value one particular type of service. An f(x) is calculated for each utilization value we provide by running the same input vector through each of the different models for each utilization value. The utilization values are used to drive an insurance cost calculator using insurance policy parameters as additional input. The insurance plan characteristics can be input by the user, either by selecting them from a menu presented on a webpage or by typing in the amounts of deductible, premium and other data that describes the plan. The result is the expected out of pocket costs to that user for the selected insurance policy. The overall procedure is depicted in FIG. 5. As noted above, the predictive engine can use empirically determined coefficients of a linear regression instead of machine learning in order to also obtain a usable model, however, the machine learning technique produces a more accurate and more broadly applicable result.

In order to minimize the above equation for the weights and cost function, the system relies on using as a construct a Lagrange function. This is explained here by introducing a dual set of variables, α and η, such that the Lagrange equation becomes:

$$L \approx \frac{1}{2}\|w\|^2 + C \sum_{i=1}^{\ell}(\xi_i + \xi_i^*) - \sum_{i=1}^{\ell} \alpha_i(\varepsilon + \xi_i - y_i + \langle w, x_i \rangle + b) -$$

$$\sum_{i=1}^{\ell} \alpha_i^*(\varepsilon + \xi_i^* + y_i - \langle w, x_i \rangle - b) - \sum_{i=1}^{\ell}(\eta_i \xi_i + \eta_i^* \xi_i^*)$$

Because the new, dual variables must be greater than or equal to 0, the partial derivatives of the primal variables (b, ξ, and w) are used to yield a new optimization problem:

$$\text{maximize } \begin{cases} -\frac{1}{2} \sum_{i,j=1}^{\ell} (\alpha_i - \alpha_i^*)(\alpha_j - \alpha_j^*)\langle x_i, x_j \rangle \\ -\varepsilon \sum_{i=1}^{\ell}(\alpha_i + \alpha_i^*) + \sum_{i=1}^{\ell} y_i(\alpha_i - \alpha_i^*) \end{cases}$$

$$\text{subject to } \begin{cases} \sum_{i=1}^{\ell}(\alpha_i - \alpha_i^*) = 0 \\ \alpha_i, \alpha_i^* \in [0, C] \end{cases}$$

These new alpha weights are determined by using quadratic programming as quadratic functions. The new f(x) function becomes:

$$f(x) = \sum_{i=1}^{\ell}(\alpha_i - \alpha_i^*)\langle x_i, x \rangle + b.$$

This is the more general Support Vector expansion of the original f(x) predictive model function. It is important to expand to this generalized form because the dot product need not be in the input space (the original space the MEPS data is in). Instead, the MEPS derived data can be transformed into a higher dimension to help with training the learning algorithm by using a kernel (i.e. a function that maps the MEPS data into a higher dimensional space). In this case, the number 1 represents the number of support vectors used in the expansion. The maximization problem and f(x) function change accordingly such that the system seeks to determine the alpha weights in order to drive the predicted value, f(x) as follows:

$$\text{maximize} \begin{cases} -\frac{1}{2} \sum_{i,j=1}^{\ell} (\alpha_i - \alpha_i^*)(\alpha_j - \alpha_j^*) k(x_i, x_j) \\ -\varepsilon \sum_{i=1}^{\ell} (\alpha_i - \alpha_i^*) + \sum_{i=1}^{\ell} y_i (\alpha_i - \alpha_i^*) \end{cases}$$

$$\text{subject to} \begin{cases} \sum_{i=1}^{\ell} (\alpha_i - \alpha_i^*) = 0 \\ \alpha_i, \alpha_i^* \in [0, C] \end{cases}$$

$$f(x) = \sum_{i=1}^{\ell} (\alpha_i - \alpha_i^*) k(x_i, x) + b.$$

Here, $k(x_i, x)$ refers to the transformation function, or kernel, that transforms data from the input space to the feature space. The $y_i$ are the training output values found in the MEPS data. The $x_i$ are the input training data from the MEPS data and the x is the user's input vector of their health status values, which will produce the utilization value f. The summation goes from 1 to the number of input training vectors that are used. The alpha and alpha* values are the coefficients calculated from the maximization solution. The alpha and alpha* refer to distances from opposite sides of the soft margin. The feature space is used to calculate the alpha weights. This means that the alpha weights are still calculated in a linear form in the feature space. However because of the implementation of a kernel function, a linear mapping in feature space is really a non-linear mapping in the input space. The selection of kernel function is made by training the system using different kernel function and determining which kernel function produces the least error across the training data set. In this more general case, the predictive engine consists of the set of alpha weights, the set of input training vectors that act as the support vectors, the bias value, if any, and the selection of kernel function.

Examples of SVR programming may be found in commercially available software packages, for example, MATLAB®. In the preferred embodiment a separate predictive model is learned for each output variable from the same input space. It is more robust to predict each different outputs value in an output vector, that is, each utilization rate value using a different predictive model. In one embodiment, the predictive model is embodied in a set of hyperplanes, one hyperplane for each output variable element in the output vector. In some embodiments, the utilization values are used to drive the calculation of estimated cost for a particular healthcare service type. This value has value apart from the user's out of pocket expenses because it can be used to analyze the effectiveness of particular insurance plans for a population group.

The system embodying the invention is trained using training data in order that the mapping function parameters are determined and also so that the resulting model may be validated. MEPS datasets can be continuously downloaded from other computer system connected by a data network, and automatically updated in the memory of the system in order to be available for analysis using the predictive model embodied in the system. In one embodiment, the dataset to train, validate, and test the learning algorithms comes from the singular MEPS data matrix, which contains dozens of feature dimensions with approximately 33,000 population examples). A set of training input vectors and a set of training output vectors is extracted from the MEPS data. This is essentially 33,000 input user health states and corresponding healthcare usage values. The MEPS dataset can be divided up into training, validation, and testing datasets using standard 15-fold cross validation. 15-fold cross validation refers to splitting the original data up into 15 subgroups (e.g. 15 groups of 10 points if there are 150 data points). The machine is trained on 15−1=14 folds and tested on the fold left out. Then another fold is chosen and removed to test on it after the new group of 14 folds are trained on.

Training data can be derived from MEPS, claims data, electronic patient data stored in a healthcare or insurance system, or any other empirically collected data the describes the condition of a population of patients and their individual outcomes. In addition, this kind of training data can also be used to calibrate the regression model embodiment of the prediction engine.

The updated MEPS data set is used to check the model output and to adjust the model. The system can also use actual clinical outcome, claims data or CMS (Centers for Medicare & Medicaid Services) data from users in order to improve the model. Therefore, as future data becomes available, system will continue to update the parameters that define the mapping from input vectors to output vectors in order to update accuracy of predictions. An optimized or validated predictive model is then embodied in the computer systems a set of parameters stored in memory in combination with a set of calculating instructions also stored in memory, where the parameters have been determined to produce a sufficiently accurate result when applied to the training data. In the preferred embodiment, cross-validation and permutation-based testing is used to validate the accuracy of the predictive model. This allows the system to develop a probability distribution of how accurate the predictions are for the training data set and how certain the predictions in the future will be when actual user input vectors are applied to the prediction engine. This a major advantage of machine learning over using simple linear (or multivariable) regression for the predictive model.

A basic architecture of the system is presented in FIG. 1. The user accesses a webpage in order to sign up for the service. A database maintains a data record for the user. The user can then use the web-page to input health status information as prompted by the web-page. This information is stored in the data record associated with the user. The database may also contain one or more insurance policies that can be selected at a time by the user in order to compare the out of pocket expense of relying on each policy. In another embodiment, the user can input insurance policy parameters into the web-page, which then stores that information in the database in a record. In addition, at a later time, a user may input actual clinical results and utilizations into the system in order to increase the amount of data used for training the predictive engine. A relational table can relate a user's input health state data with particular insurance policy records. The user's data record is used to create the user's input vector data into the system, and in combination with the selected insurance policy data, a predicted set of utilization values result is produced. In one embodiment, this result may be then input into the system as part of the training data when the clinical outcome or claims history of the user is available as well. The output of the prediction engine for the utilization rate is the raw predicted rate of usage of the medical care for that user for that category of health service. The prediction engine is then run for all of the types of healthcare services, including prescription drug costs. Those raw costs can then be input into an insurance policy modeler, which takes as input parameters defining one or more insurance policies, and then using the predicted cost, outputs the expected out-of-pocket cost of the respective insurance policy for that user.

In order to determine the total out-of-pocket cost for each health plan, the system specifies a user validated use estimate for a list of medical services including but not limited to: chiropractor visits, inpatient hospitalizations, emergency room visits, outpatient surgeries, outpatient mental health visits, outpatient non-surgical visits, urgent care visits, primary care visits, preventive care visits, specialist visits, lab tests, x-rays, other imaging. Users also provide a list of their prescription medication. Cost for each of these services are broken down by facility cost, doctor cost, and prescription market price to determine the total cost of these services without insurance coverage. For each of these services and prescription tiers, each plan is parameterized by a set of variables that describe how much of these costs are reimbursed by the insurance plan. These variable include copay, coinsurance, an indication if this service is subject to a deductible, maximum coverage, maximum visits covered, etc. Broader variables describe the plan's premium, medical deductible, prescription drug deductible, maximum person out-of-pocket, maximum family out of pocket, and any other similar policy characteristics. Using these variables, the system determines what the estimated family out-of-pocket costs will be under each plan.

The system utilizes a 12 month simulation, where for each month, for each plan for each person, and for each service and prescription drug, the annual utilization estimate and projected cost is uniformly distributed to each month. For that month, the cost reimbursement is modeled according to the plans variables and the deductibles and out of pocket expenses are summed. The time based simulation expresses the interaction between deductibles, out of pocket maximums, services limits, and various costs, and these are ultimately distilled into a total out of pocket cost calculation for each person and family for every plan. In addition, household information is used to determine if the family qualifies for any subsidies or discounts. The plan premium less discounts and the out of pocket costs determine a likely out of pocket costs for an insurance policy for a family similar to the one specified in the input vectors provided to the prediction engine.

In the preferred embodiment, the system stores in memory state variables that encode the running sums of deductibles levels, and out of pocket costs through that month. As the simulation moves forward in time, various deductible limits are met and some service limits as well. When that happens, different copay and coinsurance rates apply for the service cost in that month. These calculations are applied to the running variables. In general, the system is programmed using pseudo-code, as follows:

```
for each plan:
    for each month t,
        for each person p,
            for each service/rx s,
{
// D = deductible
s_beforeD_use_t = calc for this month subject to limits and condition
s_beforeD_cost_t = calc for this month subject to limits and condition
```

-continued

```
s_afterD_use_t = calc for this month subject to limits and condition
s_afterD_cost_t = calc for this month subject to limits and condition
OOP_p = OOP_p + copay * s_beforeD_use_t + CI_beforeD *
s_beforeD_cost_t
    + (Is_person_deductible_met or familly deduct met) *
(copay_afterD * s_afterD_use_t + CI_afterD * s_afterD_cost_t )
OOP_p = min(OOP_p, Plan_Max_OOP)
Fam_OOP = Fam_OOP + OOP_p
Fam_OOP = min(FAM_OOP, Plan_Max_FAM_OOP)
}
```

In another embodiment, the user is able to operate the web-page in order to modify the prediction engine use estimate prior to the insurance calculator determining each plan's total out of pocket cost. The ability to start with the predicted use estimate and then modify that estimate, allows the user to engage in scenario analysis to examine how changes in usage for any service or prescription will affect out of pocket cost for every plan. In this case, the web-page displays the prediction engine utilization rate output for one or more healthcare service types. At the same time, the insurance calculator may display the expected out of pocket cost. The user may then adjust one or more usage values, either by actuating an increase/decrease button on the webpage interface, or by typing in a value. The insurance calculator can then respond to the changed input by recalculating the expected out of pocket expense and re-displaying the webpage with the revised output.

In yet another embodiment, the prediction engine can be trained with a filtered set of training vectors in order to model utilization rates for different classes of the population. For example, a one predictive model may be created by only using training data associated with a geographic region while another predictive model may be created by only using training data associated with all of the geographic regions. The difference between these results would then show a prediction of how a utilization value in a geographic region may differ from the average. This may be combined with a selection of other demographic features, for example, age, gender, education or income. In yet another embodiment, the learning algorithm can be used to predict expected prescription drug use as a utilization value.

Practitioners of ordinary skill will recognize that a variety of machine learning algorithms may be used to embody the engine for predicting utilization rates. In one alternative embodiment, neural networks may be used to provide a function to apply to input vectors in order to calculate an output vector of utilization values. See, for example, Jocelyn Sietsma, Robert J. F. Dow, "Creating artificial neural networks that generalize", Neural Networks, Volume 4, Issue 1, 1991, Pages 67-79, which is incorporated herein. Neural networks can use the same user input in order to map to an output utilization vector. In another alternative, Baysian networks may be used. In yet another embodiment, Hidden Markov Chain models may be used to create the predictive model engine.

Operating Environment:

The system operates on one or more computers, typically one or more file servers connected to the Internet. The system is typically comprised of a central server that is connected by a data network to a user's computer. The central server may be comprised of one or more computers connected to one or more mass storage devices. A website is a central server that is connected to the Internet. The typical website has one or more files, referred to as web-pages, that are transmitted to a user's computer so that the user's computer displays an interface in dependence on the contents of the web-page file. The web-page file can contain HTML or other data that is rendered by a program operating on the user's computer. That program, referred to as a browser, permits the user to actuate virtual buttons or controls that are displayed by the browser and to input alphanumeric data. The browser operating on the user's computer then transmits values associated with the buttons or other controls and any input alphanumeric strings to the website. The website then processes these inputs, in some cases transmitting back to the user's computer additional data that is displayed by the browser. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive webpage operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

It is appreciated that the particular embodiment described in the specification is intended only to provide an extremely detailed disclosure of the present invention and is not intended to be limiting.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A computer system for calculating the out-of-expected out of pocket cost to a predetermined group of at least one person of a health insurance policy, comprised of at least one processor and at least one data storage device said system further comprising:
   a module adapted by logic to receive a plurality of data elements comprising at least one health state vectors, each of the at least one health state vectors corresponding to the at least one persons and being comprised of a plurality of elements, each element corresponding to a health condition type;
   a database adapted by logic to store the at least one health state vectors, said database further comprised of data parameters describing at least one payment and at least one coverage condition of the insurance policy;
   a data structure stored in a memory comprised of data representing a plurality of multivariate healthcare service functions corresponding to a plurality of healthcare service types;
   a utilization module adapted by logic to use the multivariate healthcare service function data structure and at least one health state vectors to calculate, for each of the at least one person in the predetermined group, a utilization vector, said utilization vector comprised of a plurality of elements, each element representing an expected future utilization value corresponding to one of the plurality of healthcare service types; and
   an insurance cost calculation module adapted by logic to calculate for the at least one person a corresponding expected out-of-pocket cost incurred by the at least one person by using the stored insurance policy parameters and the at least one person's corresponding utilization vector.

2. The system of claim 1 further comprised of a data structure stored in a memory representing a plurality of kernel functions where the utilization module is further adapted by logic to use the kernel function data structure and the health state vector to calculate the utilization vector, where the kernel functions are selected to transform an input training data representing historical usage of the plurality of healthcare services types into a feature space and produce an output with an error compared to a corresponding output training data that is less than a predetermined threshold.

3. The system of claim 2 where the input and output training data is derived from at least one of: Medical Expenditure Panel Survey data, CMS data, electronic patient data stored in a healthcare or insurance system.

4. The system of claim 2 where the utilization module is further comprised of logic adapted to express a learning algorithm that is used by the utilization module to select the kernel function.

5. The system of claim 4 where the utilization module is further comprised of data representing at least one support vector.

6. The system of claim 4 where the utilization module is comprised of a support vector multivariate regression calculator.

7. The system of claim 4 where the learning algorithm is either supervised or semi-supervised.

8. The system of claim 4 where the learning algorithm is unsupervised.

9. The system of claim 1 where the health state vector elements are comprised of data representing at least one of: the number of comprising the group of the at least one person, the zip code where the group resides, an income, an indication of a pre-existing medical condition, a gender, a year of birth, a smoking status, a value representing exercise habits, a weight, a height, a blood pressure, a cholesterol level, an identity of a prescription drug.

10. The system of claim 1 where the utilization vector elements are comprised of values that represent healthcare service types of at least one of: chiropractor care, outpatient non-surgery, emergency room visit, lab test, x-ray, primary care, checkup, mental health visit, hospitalization, outpatient surgery, imaging, specialist doctor visit, urgent care visit, a prescription drug.

11. The system of claim 1 where the insurance policy parameters are comprised of values that represent at least one of: a copay amount, a coinsurance, an indication if this service is subject to a deductible, a maximum coverage amount, a maximum number of visits covered, a premium amount, a medical deductible amount, a prescription drug deductible amount, a maximum person out-of-pocket amount, a maximum family out of pocket amount.

12. The system of claim 1 where the utilization module is further comprised of a multivariate regression calculator adapted by logic to calculate linear relationships among a plurality of dimensions defined by the multivariate health service functions.

13. The system of claim 1 where the utilization module is further comprised of parameter data that defines a multivariate regression model.

14. The system of claim 1 where each of the plurality of multivariate healthcare service functions are represented by data structures defining a corresponding hyperplane associated with a corresponding healthcare service type.

15. The system of claim 1 where the plurality of multivariate healthcare service functions are comprised of parameters defining at least one support vector of a support vector regression.

16. The system of claim 15 where the parameters are further comprised of parameters defining at least one kernel function.

17. The system of claim 1 where the insurance cost calculation module is adapted by logic to utilize a time based simulation of future healthcare usage.

18. The system of claim 17 where the insurance cost calculation module is adapted by logic to uniformly distribute an at least one utilization cost derived from the at least one utilization vectors to estimate over a predetermined period of time in the future.

19. The system of claim 17 where the insurance cost calculation module is further adapted by logic to store state variables representing the condition of deductible levels being reached.

20. The system of claim 17 where the insurance cost calculation module is further adapted by logic to store state variables representing the condition of coverage limits being reached.

21. The system of claim 1 where the utilization module is comprised of neural network calculator that is adapted by logic to calculate a utilization vector using the health state vector.

22. The system of claim 21 where at least one element of at least one multivariate healthcare service function is defined by at least one coefficient of the neural network.

23. The system of claim 1 where the utilization module is comprised of a Baysian network calculator that is adapted by logic to calculate a utilization vector using the health state vector.

24. The system of claim 23 where at least one element of the at least one multivariate healthcare service function is defined by at least one probability in the Baysian network.

25. The system of claim 1 where the utilization module is further adapted by logic to calculate a hyperplane using a kernel function applied to a predetermined healthcare usage input training data set corresponding to one of the plurality of healthcare service types.

26. A method executed by a computer system for calculating a prediction of the expected out-of-pocket cost to a predetermined group of at least one person of a health insurance policy, said computer system comprised of at least one processor and at least one data storage device, said method comprising:
receiving a plurality of data elements comprising at least one health state vector, each of the at least one health state vectors corresponding to the at least one persons and being comprised of a plurality of elements, each element corresponding to a health condition type;
storing in a database the received health state vector data;
retrieving from a database insurance policy parameter data describing at least one payment and at least one coverage condition of the insurance policy;
storing in a memory a data structure representing a plurality of multivariate functions corresponding to a plurality of healthcare service types;
calculating at least one utilization vector corresponding to the at least one person of the predetermined group, said utilization vector comprised of a plurality of elements, each element representing an expected future utilization value corresponding to one of the plurality of healthcare service types,
by using the plurality of multivariate healthcare service functions and the retrieved health state vector data associated with the at least one person in the predetermined group; and
calculating an expected out-of-pocket cost of the insurance policy by using the retrieved insurance policy parameters and the calculated at least one utilization vectors corresponding to the at least one person in the predetermined group.

27. The method of claim 26 further comprising:
calculating the the at least one utilization vector by using a plurality of kernel functions and the at least one corresponding healthcare state vector, where the kernel function is selected to transform an input training data representing historical usage of the plurality of healthcare services types into a feature space and produce an output with an error compared to a corresponding output training data that is less than a predetermined threshold.

28. The method of claim 27 further comprising:
deriving the input training data and output training data from at least one of: Medical Expenditure Panel Survey data, CMS data, electronic patient data stored in a healthcare or insurance system.

29. The method of claim 27 where the selecting a kernel function step is comprised of executing a learning algorithm.

30. The method of claim 29 where the executing a learning algorithm step is comprised of using a support vector machine.

31. The method of claim 29 where the executing a learning algorithm step is comprised of using a support vector multivariate regression calculation.

32. The method of claim 29 where the executing a learning algorithm step is comprised of using either a supervised or semi-supervised algorithm.

33. The method of claim 29 where the learning algorithm is unsupervised.

34. The method of claim 26 where the health state vector elements are comprised of values representing at least one of: the number of persons in the predetermined group, the zip code where the group resides, an income, an indication of a pre-existing medical condition, a gender, a year of birth, a smoking status, a value representing exercise habits, a weight, a height, a blood pressure, a cholesterol level, an identity of a prescription drug.

35. The method of claim 26 where the utilization vector elements are comprised of values that represent usage of healthcare service types of at least one of: chiropractor care, outpatient non-surgery, emergency room visit, lab test, x-ray, primary care, checkup, mental health visit, hospitalization, outpatient surgery, imaging, specialist doctor visit, urgent care visit, a prescription drug.

36. The method of claim 26 where the insurance policy parameters are comprised of values that represent at least one of: a copay amount, a coinsurance, an indication if this service is subject to a deductible, a maximum coverage amount, a maximum number of visits covered, a premium amount, a medical deductible amount, a prescription drug deductible amount, a maximum person out-of-pocket amount, a maximum family out of pocket amount.

37. The method of claim 26 where the calculating a utilization vector step is comprised of calculating linear relationships among a plurality of dimensions defined by the multivariate health service function.

38. The method of claim 26 where for each multivariate healthcare service function the elements of said vector define a multivariate regression model.

39. The method of claim 26 where each of the plurality of multivariate healthcare service functions are comprised of parameters that define a corresponding hyperplane associated with a corresponding healthcare service type.

40. The method of claim 26 where the data representing the plurality of multivariate healthcare service functions are comprised of parameters defining at least one support vector of a support vector regression.

41. The method of claim 40 where the parameters are further comprised of parameters defining at least one kernel function.

42. The method of claim 26 where the step of calculating the expected out-of-pocket cost is comprised of utilizing a time based simulation of expected future healthcare usage to determine an expected cost estimate for a predetermined time period in the future.

43. The method of claim 42 where the step of calculating the expected out-of-pocket cost is further comprised of storing state variables representing the condition of deductible levels being reached.

44. The method of claim 42 where the step of calculating the expected out-of-pocket cost is further comprised of storing state variables representing the condition of coverage limits being reached.

45. The method of claim 26 where the step of calculating the expected out of pocket cost is further comprising: uniformly distributing an at least one calculated expected cost to each month during the predetermined time period in the future.

46. The method of claim 26 where the calculating a utilization vector step is comprised of calculating a neural network output result.

47. The method of claim 26 where the calculating a utilization vector step is comprised of calculating a Baysian network output result.

48. The method of claim 26 where the step of calculating a utilization vector is further comprised of: calculating a plurality of hyperplanes using a corresponding plurality of kernel functions determined by selecting kernel functions that produce a minimum error across a predetermined healthcare usage training data set corresponding to the plurality of healthcare service types.

\* \* \* \* \*